United States Patent [19]

Golben et al.

[11] Patent Number: 5,623,987

[45] Date of Patent: Apr. 29, 1997

[54] MODULAR MANIFOLD GAS DELIVERY SYSTEM

[75] Inventors: P. Mark Golben, Florida, N.Y.; John E. Fox, Sparta, N.J.

[73] Assignee: Ergenics, Inc., Ringwood, N.J.

[21] Appl. No.: 464,297

[22] Filed: Jun. 5, 1995

Related U.S. Application Data

[62] Division of Ser. No. 925,591, Aug. 4, 1992, Pat. No. 5,450,721.

[51] Int. Cl.⁶ ..................................... F28D 15/00
[52] U.S. Cl. .................. 165/104.12; 165/144; 165/176; 62/480
[58] Field of Search .................. 165/144, 104.12, 165/176; 62/480, 324.2; 60/284, 300

[56] References Cited

U.S. PATENT DOCUMENTS

| | | | |
|---|---|---|---|
| 367,078 | 7/1887 | Weber | 165/144 |
| 4,135,621 | 1/1979 | Turillon et al. | 206/0.7 |
| 4,402,187 | 9/1983 | Golben et al. | 62/48 |
| 4,457,136 | 7/1984 | Nishizaki et al. | 165/104.12 X |
| 4,505,120 | 3/1985 | Golben et al. | 62/48 |
| 4,687,049 | 8/1987 | Golben | 165/1 |
| 4,736,596 | 4/1988 | Iguchi et al. | 165/104.12 X |
| 4,741,156 | 5/1988 | Buchner | 165/104.12 X |
| 4,781,246 | 11/1988 | Golben | 165/104.12 |
| 4,884,953 | 12/1989 | Golben | 417/379 |
| 4,940,084 | 7/1990 | Grieb | 165/176 X |
| 4,969,510 | 11/1990 | Greune | 165/176 X |
| 5,246,064 | 9/1993 | Hoshino et al. | 165/146 |

*Primary Examiner*—John Rivell
*Assistant Examiner*—Christopher Atkinson
*Attorney, Agent, or Firm*—Dorn, McEachram, Jambor & Keating; Vangelis Economou

[57] ABSTRACT

A system and method is provided whereby exhaust gases from a cold started internal combustion engine are rapidly brought to catalytic combustion conditions. Specifically, a closed system of a low pressure metal hydride heat exchanger and a high pressure metal hydride heat exchanger is provided which, upon engine ignition, effectuates hydrogen flow from the high pressure alloy exchanger to the low pressure alloy exchanger with rapid heating of the low pressure alloy due to hydrogen occlusion, and with the further provision that the heated low pressure hydride alloy exchanger is in heat exchange relationship with the cold started engine exhaust gases or the vehicle catalytic converter and provides heat necessary for initiation of catalytic combustion of pollutants in the said exhaust gases.

12 Claims, 9 Drawing Sheets

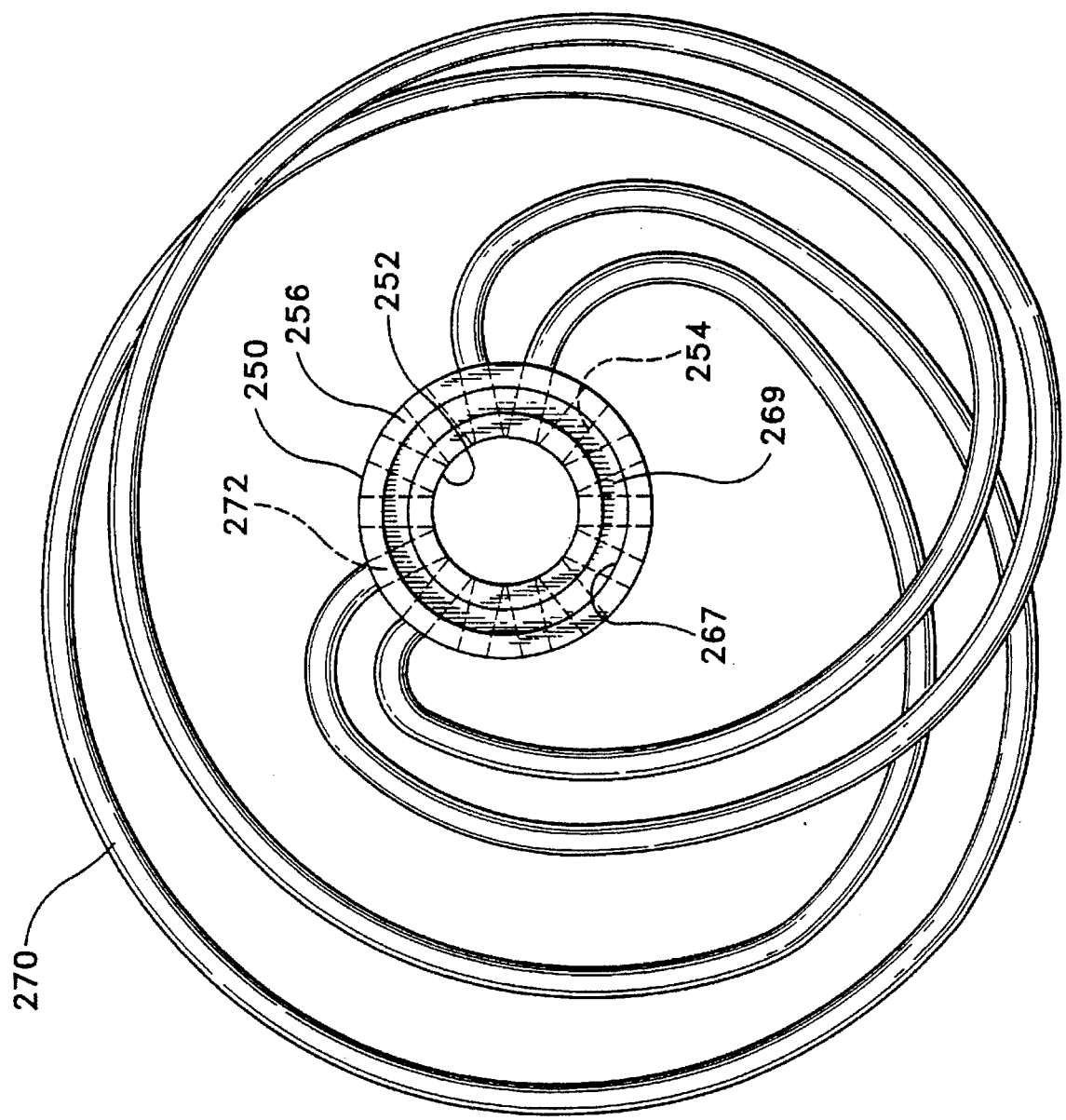

MODULAR MANIFOLD GAS DELIVERY SYSTEM

This is a divisional of application Ser. No. 07/925,551 filed on Aug. 4, 1992, now U.S. Pat. No. 5,450,721.

BACKGROUND OF THE INVENTION

1. Field of the Invention

The present invention relates to a method and apparatus for the rapid preheating of internal combustion engine exhaust gases by means of a metal hydride heating system. In a preferred embodiment, the invention provides both rapid preheating of engine exhaust gases and rapid cooling or air conditioning of a motor vehicle interior.

2. Description of the Prior Art

Currently, many internal combustion engines in automobiles are equipped with a catalytic converter for purifying the engine exhaust gas. Almost every catalyst now used for this purpose displays its ability to the extent of practical satisfaction only when it is maintained at a sufficiently high temperature. While the engine is operating under normal conditions, the temperature of the exhaust gas is high enough to allow the catalyst in the catalytic converter to work satisfactorily efficiently. However, the catalyst cannot work satisfactorily when the exhaust gas temperature is relatively low as is usual for some time immediately after cold-starting of the engine. Accordingly, it becomes necessary to provide the catalytic converter or the engine with a warm-up means for promoting warm-up of the catalyst in the catalytic converter to render the catalyst effective as soon as possible after starting of the engine.

As a practical example of hitherto proposed warm-up means for automotive catalytic converters, there is a system which is so constructed as to promote warm-up of the catalyst during idling of the engine immediately after cold-starting by slightly increasing the opening degree of the throttle valve with the intention of supplying an increased quantity of exhaust gas to the catalytic converter and at the same time slightly retarding the ignition timing in order to raise the temperature of the exhaust gas. Usually, a throttle opening device and an ignition timing retarding device in this system are both of a vacuum-operated type having a flexible diaphragm with a vacuum chamber defined on one side of the diaphragm, and these two devices are individually connected to the intake passage at a section downstream of the throttle valve such that vacuum created in the intake manifold can simultaneously be applied to the two devices. An electromagnetic valve is used to admit air into the vacuum passages for these two devices during normal operation of the engine and block the admission of air while the engine is idling and the temperature of the engine or the engine cooling water is below a predetermined temperature.

In practical operation of this warm-up system, however, the throttle opening device and the ignition timing retarding device often fail to simultaneously come into operation, although the electromagnetic valve causes simultaneous application of vacuum to the two devices, because of the inevitable differences in operating characteristics between these two devices attributed to dispersions of quality in mass production and variations of the degree of deterioration by aging. For example, a synthetic rubber used as the material of the diaphragms in the vacuum-operated devices is liable to undergo a change in its hardness with the lapse of time, and the rate of the change is considerably variable depending on various factors such as the processing conditions, environmental temperatures, etc. Therefore, there is a strong possibility that the ignition timing retarding device comes into action earlier than the throttle opening device, causing the engine to stall or become unstable. Also it is probable that the action of the throttle opening device precedes the action of the ignition timing retarding device. This sequence is rather favorable insofar as the time lag is adequately small, but when the time lag is too great there occurs unwanted increase in the engine speed with augmentation of noise. When the engine is warmed up to the predetermined temperature and/or the gears of the transmission are shifted from the neutral position, it is not certain whether the two vacuum-operated devices become simultaneously inoperative or either of them becomes inoperative precedent to the other, despite desirableness of the simultaneous reaction of the two devices or slightly earlier reaction of the throttle opening device.

U.S. Pat. No. 4,388,803 provides a complex arrangement designed to overcome the above disadvantages.

U.S. Pat. Nos. 4,928,485 and 5,118,475 provide for the electrical heating of an internal combustion engine catalytic converter prior to contact with cold exhaust at engine start up.

Efforts such as above described to provide for the rapid preheating of engine exhaust gases on start-up have not been entirely successful by reason of the expense and complexity of the proposed devices despite the desirable objective of reducing pollution by rapid gas preheating upon engine start-up.

A newer technology has emerged whereby metal hydrides which occlude hydrogen in large quantities have been proposed for use in various heating and cooling applications. See, for example, U.S. Pat. Nos. Re 30,840, 4,039,023, 4,044,819, 4,111,002, 4,161,211, 4,178,987, 4,188,795, 4,200,144, 4,262,739, 4,372,376, 4,402,915, 4,409,799, 4,422,500, 4,436,539, 4,523,635, 4,589,479, 4,599,867, 4,928,496, 4,939,902, 4,995,235 and 5,048,299.

U.S. Pat. No. 4,385,726 describes the use of low-temperature and high-temperature reservoir hydride forming materials in conjunction with internal combustion engine vehicles. Heat generated in the high temperature reservoir upon engine start-up is used to heat engine cooling water or the passenger compartment. Engine exhaust heat during operation is used to desorb hydrogen from the high temperature reservoir and transfer same to the low temperature reservoir.

U.S. Pat. Nos. 4,939,902 and 5,048,299 refer to metal hydride alloy systems useful in automotive air conditioning.

U.S. Pat. No. 4,396,114 refers to metal hydride alloy heat exchange means.

BRIEF DESCRIPTION OF THE INVENTION

In accordance with the present invention, there is provided an improved method and apparatus whereby catalytic reaction of undesirable components in the exhaust gas of an internal combustion engine can be rapidly initiated upon engine start-up. Specifically, a closed metal hydride system is provided comprised of at least two alloys which occlude hydrogen and release hydrogen at different conditions, the hydride system being in direct heat exchange relationship with the exhaust gases from an internal combustion engine and/or the catalytic converter associated therewith and adapted to rapidly heat the exhaust gases and/or the catalytic converter on engine start-up to a temperature sufficiently high to cause almost immediate effective reaction of exhaust impurities in the catalytic converter. In an especially preferred embodiment, the hydride system is also in heat exchange relationship with the inside air of the motor vehicle and effectively provides rapid cooling to this interior air at the same time or after the exhaust gases and/or catalytic converter are preheated.

BRIEF DESCRIPTION OF THE DRAWINGS

The attached

FIG. 7 illustrates a detail view of the assembly of FIG. 6 and the connection to tubular elements which contain the metal hydride alloys.

DETAILED DESCRIPTION OF THE PREFERRED EMBODIMENTS

In accordance with the present invention, a closed metal hydride heating system is provided in heat exchange relationship with the exhaust gases and/or the catalytic converter of an internal combustion engine. The metal hydride heating system consists essentially of a low temperature high pressure metal hydride alloy characterized by a high hydrogen pressure, e.g. at least 10 psia at room temperature, and a high temperature low pressure metal hydride alloy characterized by a low hydrogen pressure at 300°–400° C. The low and high pressure hydride alloys are positioned in appropriate means such as tubular coils and are connected by a conduit through which hydrogen released from one alloy can reversibly flow and be occluded on the other alloy. Valving means are provided to permit hydrogen passage required during operation.

The low pressure metal hydride alloy is in direct heat exchange relationship with the internal combustion engine exhaust gases and/or the catalytic converter while the high pressure metal hydride alloy is in direct heat exchange relationship with ambient air from outside the vehicle or with the vehicle interior air.

In operation, when the vehicle ignition key is turned on, the valving means in the hydrogen conduit opens permitting the passage of hydrogen from one metal hydride alloy to the other. Hydrogen is immediately released from the high pressure metal hydride alloy and flows through the conduit to the low pressure alloy where it is rapidly occluded causing immediate release of heat and a sharp temperature rise, e.g. from ambient temperature to 350° C. or so in a matter of seconds. Exhaust gases from the cold started engine are passed in heat exchange relationship with the heated low pressure alloy and are rapidly heated to a temperature high enough for effective reaction of impurities in the catalytic converter. Alternatively, the heated low pressure alloy can be used to directly heat the catalytic converter to effective reaction temperature.

The high pressure metal hydride alloy undergoes rapid cooling as hydrogen is released therefrom and passes to the low pressure alloy. In especially preferred practice, interior vehicle air is circulated in heat exchange relationship with the cooled high pressure metal hydride alloy thus providing an immediate air conditioning effect where this is desired.

After a short period of operation, the temperature of the exhaust gases from the engine rises to the normal elevated operating level. The exhaust gases then provide heat to the low pressure metal hydride alloy causing the alloy to dehydrogenate with the hydrogen passing from the low pressure metal hydride alloy back through the hydrogen conduit to recharge the high pressure metal hydride alloy.

Various embodiments of the invention are feasible and are illustrated schematically in attached FIGS. 1–4.

Figure 1:
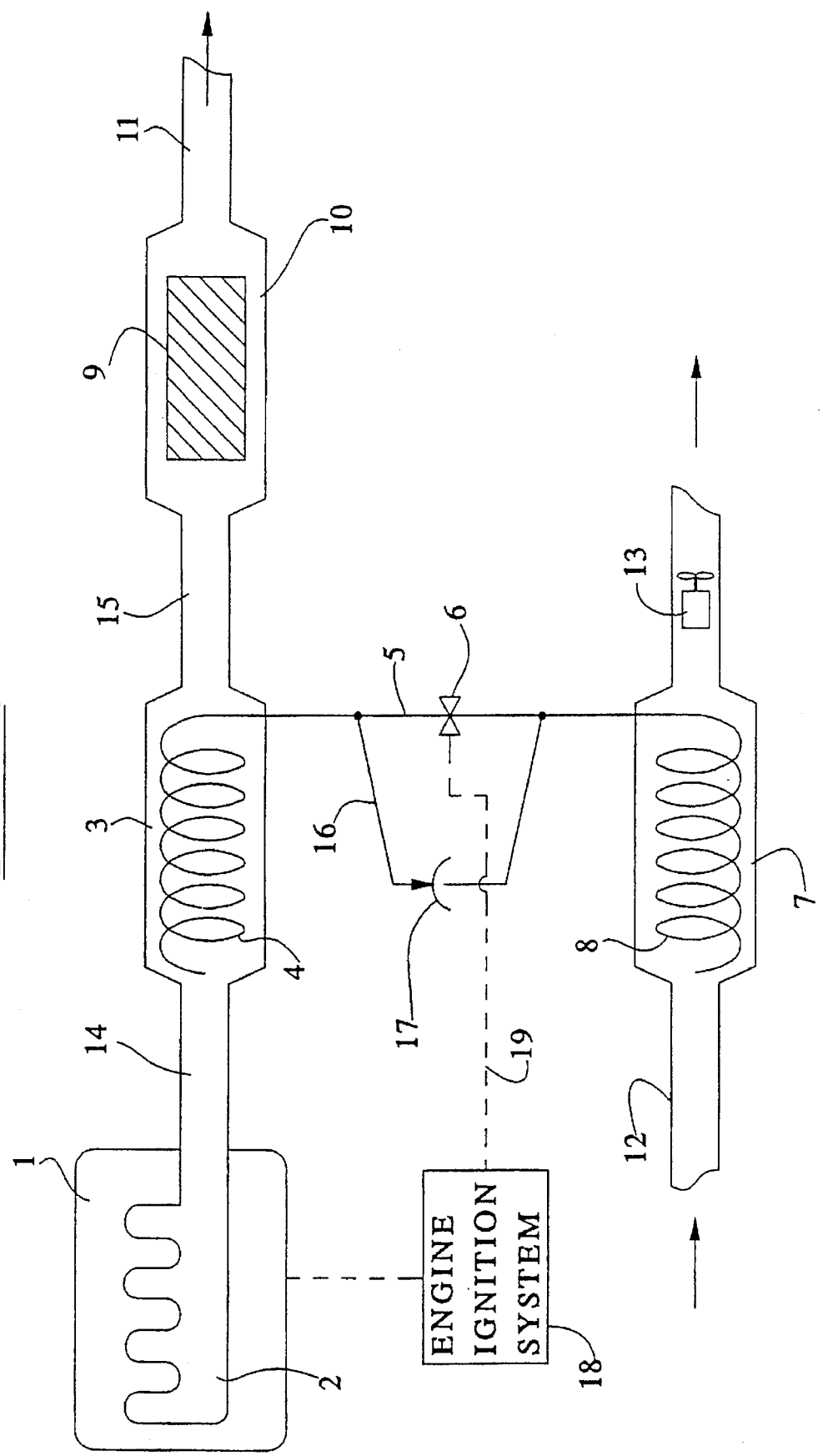
FIGS. 1–4 show schematically various embodiments of the invention.

In FIG. 1, practice of the invention is illustrated wherein the engine exhaust gases are preheated by exchange with the heated low pressure alloy before the exhaust gases pass through the catalytic converter.

Figure 2:
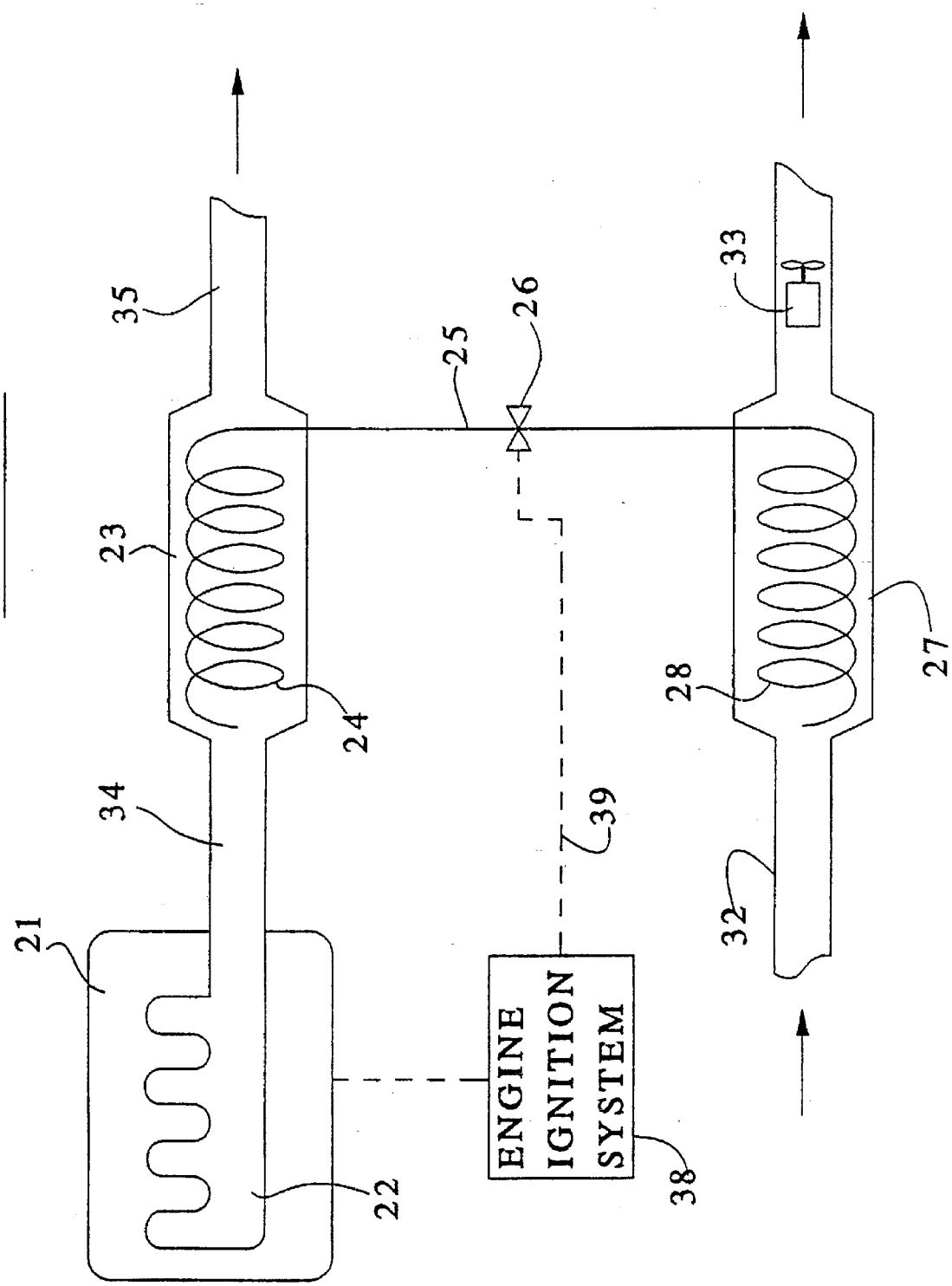

In FIG. 2, practice of the invention is illustrated wherein the low pressure alloy is directly associated with the catalytic converter and provides heat thereto and exhaust gases are heated by contact with the converter.

Figure 3:
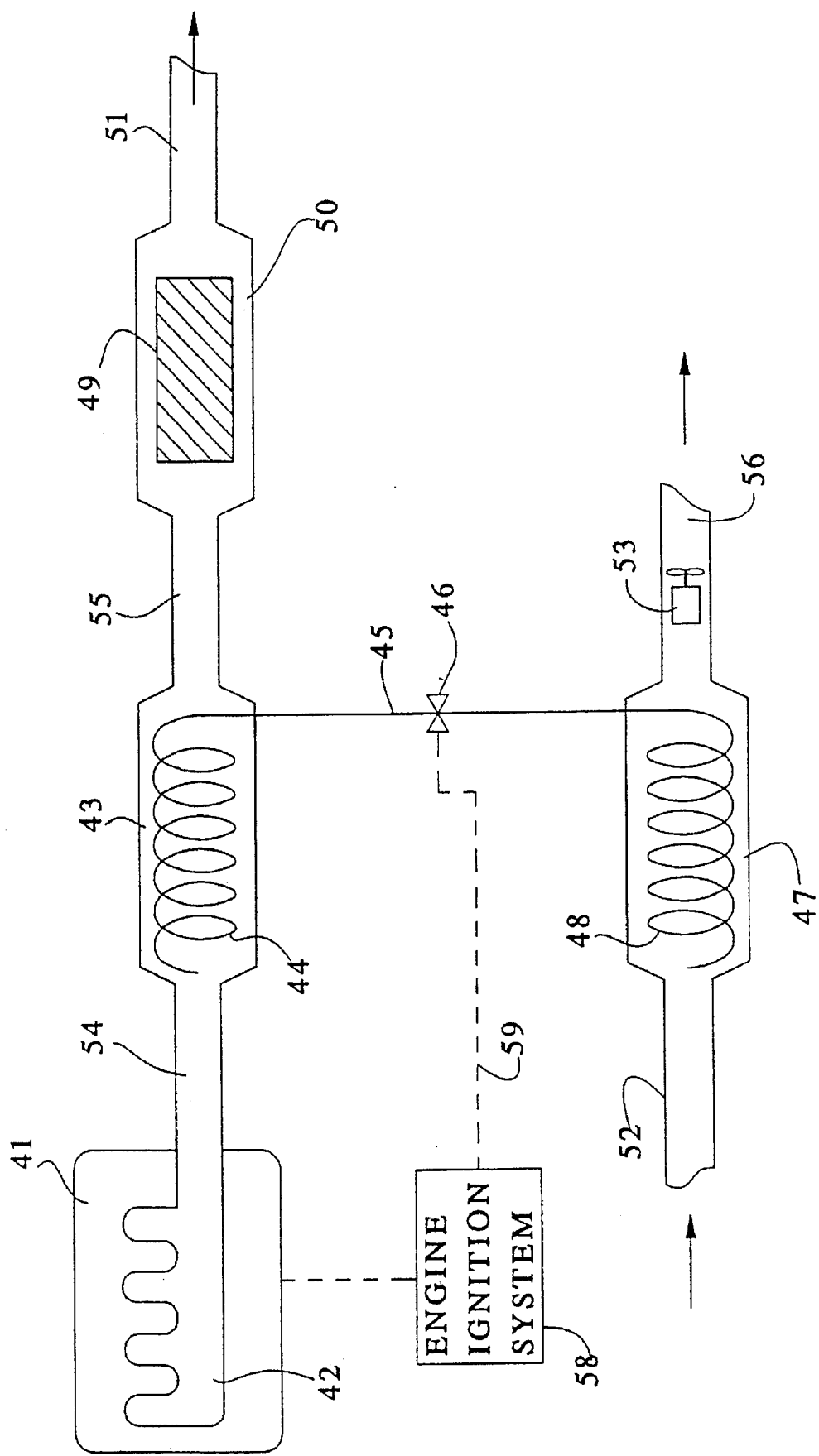

FIG. 3 illustrates practice of the invention wherein both exhaust gas preheat and initial vehicle air conditioning are accomplished.

Figure 4:
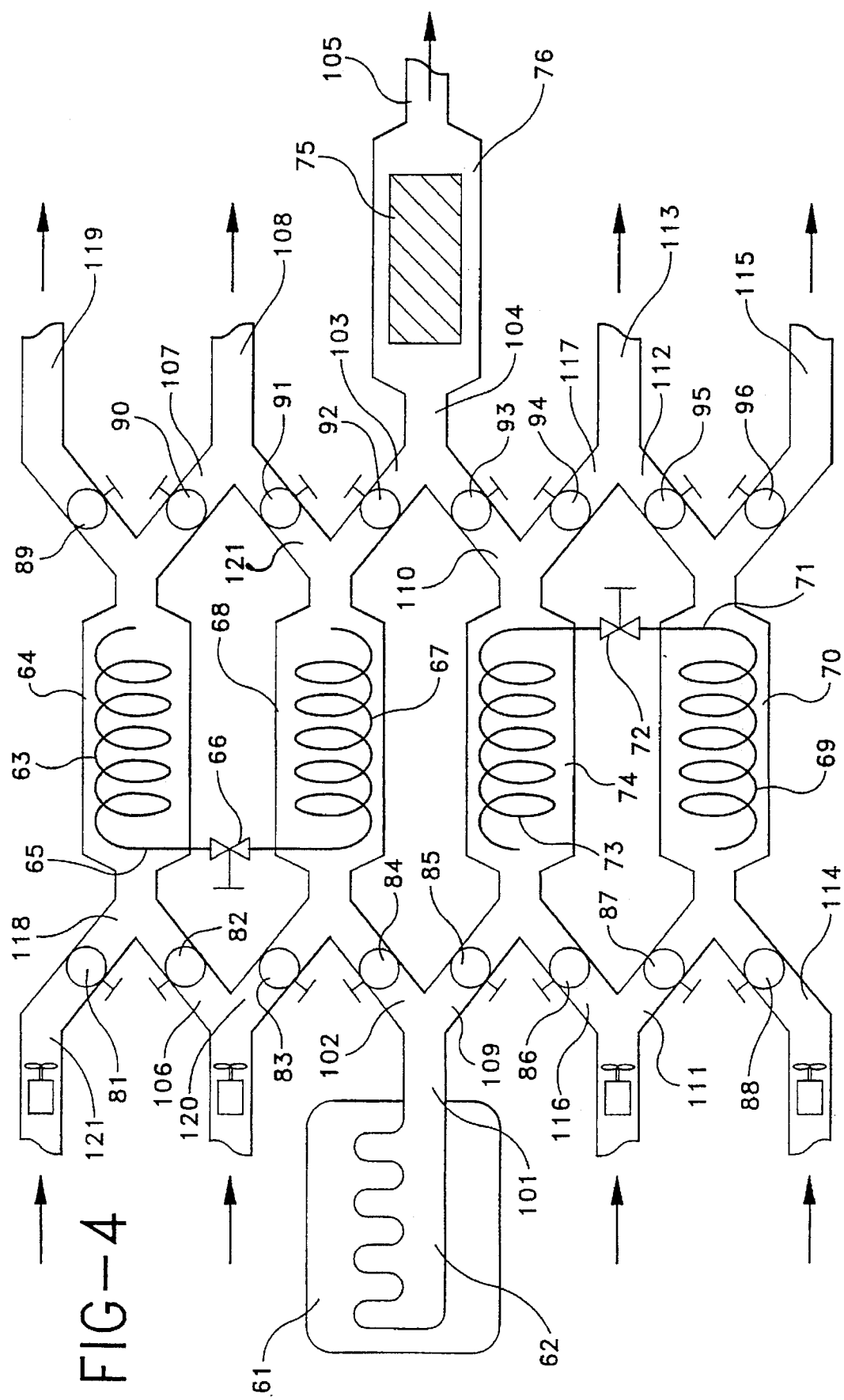

FIG. 4 illustrates a mode of practice of the invention wherein both exhaust gas preheat and subsequent continuous vehicle air conditioning are accomplished.

Referring to FIG. 1, there is depicted in schematic fashion practice of the invention wherein the cold engine exhaust gases are preheated before passing to the catalytic converter. Depicted in FIG. 1 are internal combustion engine 1 having exhaust gas manifold 2. There is provided heat exchange zone 3 having positioned therein low pressure metal hydride alloy sealed within tubular heat transfer means 4. Hydrogen conduit 5 is provided permitting passage of hydrogen, when solenoid valve 6 is in the open position between heat transfer zone 7 which has positioned therein high pressure metal hydride alloy sealed within tubular heat transfer means 8 and zone 3. A conventional catalytic converter 9 is provided in zone 10.

In operation, valve 6 is operatively connected to the vehicle ignition system 18 by a connection means 19 such that when the ignition key is turned on, valve 6, which is in the closed position when ignition is off, opens. The high pressure metal hydride alloy in heat exchanger 8 immediately dehydrogenates and, as a result, undergoes a sharp temperature decrease. Hydrogen flows within the sealed hydride system from the high pressure alloy via conduit 5 through open valve 6 to the low pressure alloy in exchanger 4. The hydrogen is occluded on the low pressure alloy causing a very rapid temperature rise. Upon start-up of engine 1, cool, pollutant-containing exhaust gases pass via manifold 2 and conduit 14 to zone 3 wherein the gases pass in heat exchange relationship with low pressure metal alloy exchanger 4 which is preferably a tubular coil or other suitable configuration. The exhaust gases are almost immediately heated in zone 3 to catalytic converter conversion conditions and pass via conduit 15 to catalytic converter 9 wherein harmful components of the exhaust gas are converted in a conventional way. Exhaust from catalytic conversion zone 10 passes to the atmosphere via exhaust conduit 11.

Ambient air is passed to zone 7 by means of conduit 12 and fan 13 and provides the heat needed to continue the release of hydrogen gas out of the high pressure metal hydride alloy stored in tubular coil heat exchanger 8, the air passing in heat exchange relationship with the high pressure alloy exchanger 8.

Hydrogen transfer from the high pressure alloy to the low pressure alloy is generally complete in less than 2 minutes, usually less than 1 minute and preferably the valving means 6 permitting transfer of hydrogen from the high pressure hydride alloy zone to the low pressure alloy zone is then closed by appropriate timing or other means. In especially preferred practice, as described in FIG. 1, conduit 16 and one-way valve means 17 are provided such that hydrogen, which is desorbed from the low pressure metal hydride alloy during normal engine operation, passes via conduit 16 and one-way or check valve 17 back to zone 8 wherein it is occluded on the high pressure metal hydride alloy and stored thereon until the engine is next cold started. It is quite feasible to operate the system without conduit 16 and one-way valve means 17, in which case valve 6 remains open until ignition is turned off, desorbed hydrogen returning from heat exchanger 4 to exchanger 8 via conduit 5 during normal engine operation.

FIG. 2 shows schematically an arrangement similar to that shown in FIG. 1 except that in FIG. 2 the low pressure metal hydride alloy forms an integral part of the catalytic converter and upon occlusion of hydrogen, the metal hydride alloy directly heats the catalytic converter to sufficient temperatures for reaction of the harmful components in the exhaust gas.

Referring to FIG. 2, there is provided internal combustion engine 21 with exhaust manifold 22 leading via conduit 34 to heating and catalytic conversion zone 23. In zone 23, there is provided the low pressure hydride alloy exchanger in direct heat exchange relationship with the catalytic converter means. As depicted in FIG. 2, tubular coil 24 represents the tubular coil heat exchanger containing the low pressure hydride alloy, the tubular coil being coated on its external surface with a conventional catalyst which is effective to catalyze reaction of exhaust gas pollutant components. In especially preferred practice, tubular coil 24 is coated with alumina by known means such as by application of a slurry of alumina in water followed by heating, and a catalyst such as platinum or palladium is impregnated onto the alumina to provide the catalyst coated heat exchanger. As an alternative shown in FIG. 29, the low pressure metal hydride heat exchanger can be structurally incorporated within a ceramic catalytic converter of the type normally used.

Figure 2A:
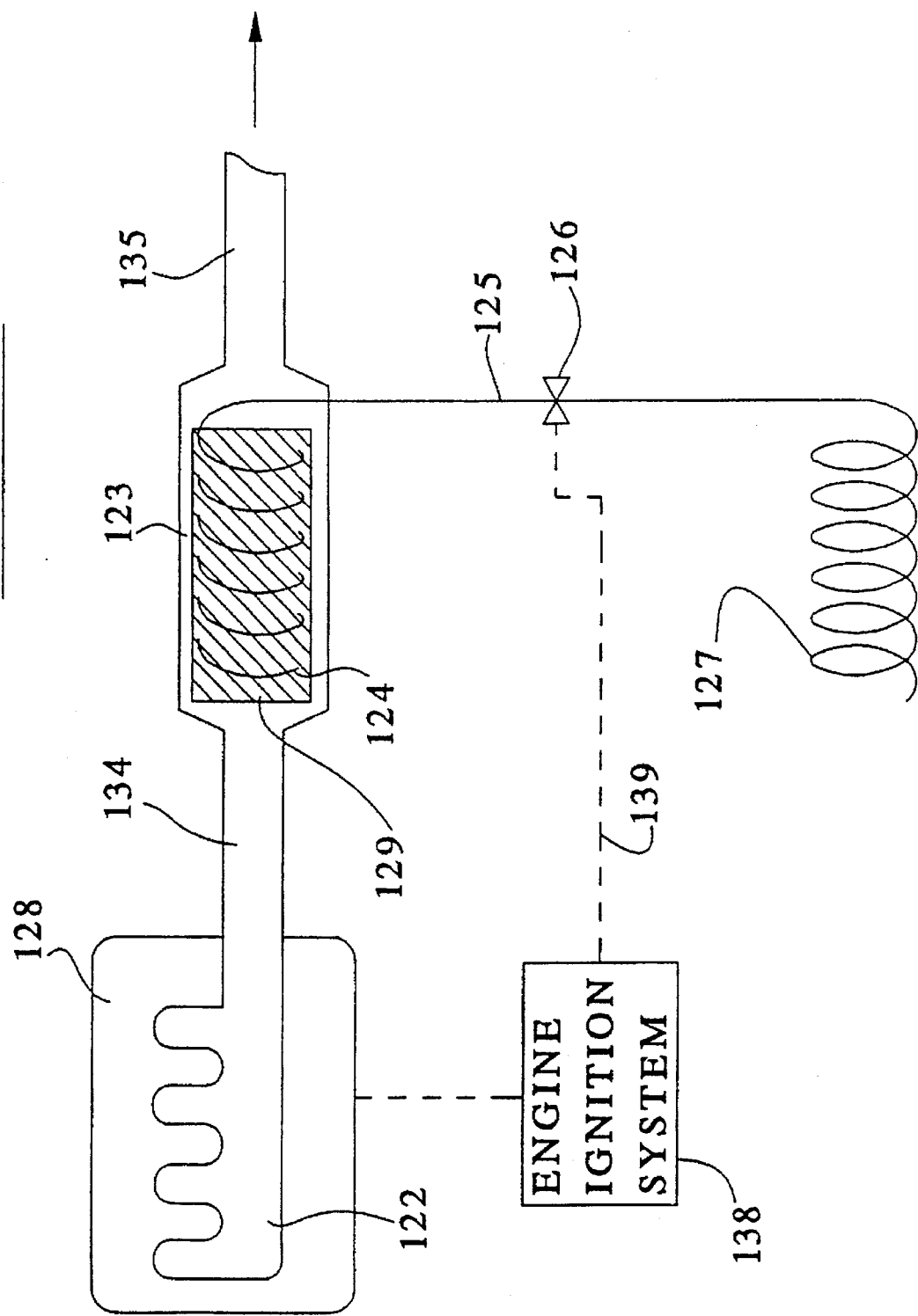
FIG. 2a illustrates un schematic form another embodiment of the invention.

FIG. 2a illustrates in schematic form an embodiment of the invention in which the low pressure metal hydride alloy heat exchanger is in direct contact relationship with said catalytic converter. As shown, there is provided internal combustion engine 128 with exhaust manifold 122 leading via conduit 134 to heating and catalytic conversion zone 123. In zone 123, there is provided the low pressure hydride alloy exchanger 124 in direct heat exchange relationship with the catalytic converter means such as conventional catalytic converter 129. As depicted in FIG. 2a, tubular coil 124 represents the tubular coil heat exchanger containing the low pressure hydride alloy. The low pressure metal hydride heat exchanger coil 124 is structurally incorporated within a conventional ceramic catalytic converter 129.

Hydrogen conduit 125 is provided permitting passage of hydrogen, when solenoid valve 126 is in the open position, between hydrogen storage zone 127 which has sealed therein high pressure metal hydride alloy and heating and catalytic conversion zone 123.

In operation, valve 126 is operatively connected to the vehicle ignition system 138 by a connection means 139 such that when the ignition key is turned on, valve 126, which is in the closed position when ignition is off, opens. The high pressure metal hydride alloy in hydrogen storage zone 127 immediately dehydrogenates. Hydrogen flows within the sealed hydride system from the high pressure alloy via conduit 125 through open valve 126 to the low pressure alloy in exchanger 124. The hydrogen is occluded on the low pressure alloy causing a very rapid temperature rise of the alloy and of the catalytic converter incorporated with the heat exchanger coil 124. Upon start-up of engine 128, cool, pollutant-containing exhaust gases pass via manifold 122 and conduit 134 to catalytic conversion zone 123 wherein the heated catalytic converter 129 heats up the exhaust gases by contact with exchanger 124 to conversion temperature, and pollutants contained therein are catalytically reacted. Exhaust gases from zone 123 pass via conduit 135 to the atmosphere.

Hydrogen conduit 25 is provided permitting passage of hydrogen, when solenoid valve 26 is in the open position, between heat transfer zone 27 which has positioned therein high pressure metal hydride alloy sealed within heat transfer means 28 and heating and catalytic conversion zone 23. Heat transfer means 28 preferably is a tubular coil.

In operation, valve 26 is operatively connected to the vehicle ignition system 38 by a connection means 39 such that when the ignition key is turned on, valve 26, which is in the closed position when ignition is off, opens. The high pressure metal hydride alloy in tubular heat exchanger 28 immediately dehydrogenates and, as a result, undergoes a sharp temperature decrease. Hydrogen flows within the sealed hydride system from the high pressure alloy via conduit 25 through open valve 26 to the low pressure alloy in exchanger 24. The hydrogen is occluded on the low pressure alloy causing a very rapid temperature rise of the alloy and the catalytic converter associated therewith. Upon start-up of engine 21, cool, pollutant-containing exhaust gases pass via manifold 22 and conduit 34 to catalytic conversion zone 23 wherein the gases are heated by contact with exchanger 24 to conversion temperature, and pollutants contained therein are catalytically reacted. Exhaust gases from zone 23 pass via conduit 35 to the atmosphere. Ambient air is passed to zone 27 by means of conduit 32 and fan 33 and provides the heat needed to continue the release of hydrogen gas out of the high pressure metal hydride alloy.

Hydrogen transfer from the high pressure alloy to the low pressure alloy is generally complete in 2 minutes, but can be designed to provide heat for much longer periods.

After a short period of operation, the engine exhaust gases reach normal elevated temperatures and heat the low pressure hydride alloy in zone 23 causing dehydrogenation of the alloy and flow of hydrogen back through conduit 25 and valve 26 to the high pressure hydride alloy exchanger 28 where the hydrogen is occluded. Heat of occlusion is removed by indirect exchange with air introduced into zone 27 by means of conduit 32 and fan 33. The recharging of the high pressure alloy can continue until the engine ignition is turned off causing closing of solenoid valve 26, wherein the system is ready when the engine is next cold started.

Alternatively, a conduit and one-way valve means can be employed similar to that described in FIG. 1.

FIG. 3 describes a practice of the invention which is very similar to that described in FIG. 1 except that heat necessary to drive hydrogen from the high pressure hydride alloy to the low pressure hydride alloy is provided by indirect heat exchange with circulating interior vehicle air thus providing an immediate air conditioning effect within the vehicle.

In the embodiment shown in FIG. 3, the air used to heat the high pressure metal hydride heat exchanger is circulating vehicle interior air. The effect of circulating interior air through the high pressure metal hydride alloy exchanger is to rapidly cool this air immediately after the vehicle engine is started. Obviously, the air conditioning is not desirable in all climactic conditions and thermostatic means are provided to regulate the air flow between the interior and the exterior of the vehicle depending upon the immediate need for vehicle air conditioning. A characteristic of this system of the present invention is that the air conditioning benefit lasts only a relatively short time until the engine exhaust gases are heated, reach their normal operating temperatures and cause a reversal in hydrogen flow from the low pressure metal hydride alloy to the high pressure metal hydride alloy. When this point is reached, the high pressure exchanger no longer functions to cool air in heat exchange relationship with it, and thermostatic means is provided for diversion of the air to the atmosphere. It will be appreciated, however, that this operation is exceedingly advantageous under certain conditions in that it not only provides for substantially instantaneous preheating of cooled exhaust gases, but it also provides for substantially instantaneous cooling of the vehicle interior. This latter feature is extremely desirable, for example in situations where the vehicle has been parked for a substantial period of time in the direct sun.

Referring to FIG. 3, there is provided internal combustion engine 41 having exhaust gas manifold 42. There is provided heat exchange zone 43 having positioned therein low pressure metal hydride alloy sealed within tubular heat transfer means 44. Hydrogen conduit 45 is provided permitting passage of hydrogen when solenoid valve 46 is in the open position between heat transfer zone 47 which has positioned therein high pressure metal hydride alloy sealed within tubular heat transfer means 48 and zone 43. A conventional catalytic converter 49 is provided in zone 50.

In operation, valve 46 is operatively connected to the vehicle ignition system 58 by a connection means 59 such that when the ignition key is turned on, valve 46, which is in the closed position when ignition is off, opens. The high pressure metal hydride alloy in heat exchanger 48 immediately dehydrogenates and, as a result, undergoes a sharp temperature decrease. Hydrogen flows within the sealed hydride system from the high pressure alloy via conduit 45 through open valve 46 to the low pressure alloy positioned in exchanger 44. The hydrogen is occluded on the low pressure alloy causing a very rapid temperature rise. Upon start-up of engine 41, cool, pollutant-containing exhaust gases pass via manifold 42 and conduit 54 to zone 43 wherein the gases pass in heat exchange relationship with low pressure metal alloy exchanger 44 which is preferably a tubular coil or other suitable configuration. The exhaust gases are almost immediately heated in zone 43 to catalytic converter conversion conditions and pass via conduit 55 to catalytic converter 49 in zone 50 wherein harmful components of the exhaust gas are converted in a conventional way. Exhaust from catalytic conversion zone 50 passes to the atmosphere via exhaust conduit 51.

Interior vehicle air is passed to zone 47 by means of conduit 52 and fan 53 and provides the heat needed to continue the release of hydrogen gas out of the high pressure metal hydride alloy stored in heat exchanger 48, the interior air passing in heat exchange relationship with the high pressure alloy exchanger 48. The interior air is cooled by this heat exchange and is circulated to the vehicle interior via conduit 56 to provide vehicle air conditioning.

Hydrogen transfer from the high pressure alloy to the low pressure alloy is generally complete in 2 minutes, but can be designed to provide heat for much longer periods.

After a short period of operation, the engine exhaust gases reach normal elevated temperatures and heat the low pressure hydride alloy in zone 43 causing dehydrogenation of the alloy and flow of hydrogen back through conduit 45 and valve 46 to the high pressure hydride alloy exchanger 48 where the hydrogen is occluded. At this point, by appropriate means ambient air rather than circulating interior vehicle air is passed to zone 47 via conduit 52. Heat of occlusion is removed by indirect exchange with the ambient air introduced into zone 47 by means of conduit 52 and fan 53. The recharging of the high pressure alloy can continue until the engine ignition is turned off causing closing of solenoid valve 46, wherein the system is ready when the engine is next cold started.

Alternatively, a conduit and one-way valve means can be employed similar to that described in FIG. 1.

FIG. 4 describes in schematic fashion practice of the invention wherein both rapid exhaust gas preheat on cold engine start-up as well as continuous vehicle interior air conditioning is provided. In this embodiment two pairs of metal hydride alloy heat exchangers are employed.

Referring to FIG. 4, internal combustion engine 61 with exhaust gases manifold 62 is provided. Two separate closed metal hydride alloy heat exchanger systems are provided each consisting of a low pressure metal hydride alloy exchanger and a high pressure metal hydride alloy exchanger connected by a hydrogen conduit having appropriate solenoid valve means.

In FIG. 4, one exchanger system comprises high pressure tubular metal hydride alloy exchanger 63 in heat exchange zone 64 connected via conduit 65 having solenoid valve 66 to tubular low pressure metal hydride alloy exchanger 67 in heat exchange zone 68. A second system comprises tubular high pressure metal hydride alloy exchanger 69 in heat exchange zone 70 connected via conduit 71 having solenoid valve 72 to tubular low pressure metal hydride alloy exchanger 73 in heat exchange zone 74. Catalytic converter 75 is provided in catalytic conversion zone 76. Appropriate fan and valve means are provided as hereinafter described, valves 81 though 96 being suitable gate valves adapted to regulate gas flow through the corresponding conduits.

Prior to cold starting internal combustion engine 61, high pressure metal hydride alloy exchangers 63 and 69 are fully charged with hydrogen, solenoid valves 66 and 72 are closed as are gate valves 81 through 96. When the engine ignition key is turned on, solenoid valve 66 opens allowing hydrogen gas to flow from exchanger 63 via conduit 65 to exchanger 67 wherein the hydrogen is occluded causing a rapid temperature rise in exchanger 67. At the same time gate valves 84 and 92 open allowing engine exhaust gas to pass via conduits 101 and 102 to heat exchange zone 68 wherein the gases are heated to catalytic converter reaction temperature by heat exchange with tubular coil 67, before passing via conduits 103 and 104 to zone 76 wherein pollutants are catalytically reacted in converter 75, exhaust gases exiting via conduit 105.

At the same time, gate valves 82 and 90 open permitting ambient air to flow via conduit 106 to zone 64 thereby providing heat to high pressure metal hydride alloy exchanger 63 to complete the release of hydrogen therefrom to exchanger 67. The ambient air passes from zone 64 via conduits 107 and 108 to the atmosphere.

After about 2 minutes or so, this heat and hydrogen transfer process is completed and solenoid valve 66 closes while solenoid valve 72 opens. Also gate valves 84, 92, 82 and 90 close while gate valves 85, 93, 87 and 95 open. This results in hydrogen flow from high pressure tubular exchanger 69 to low pressure tubular exchanger 73, exhaust gas passing via conduits 101 and 109 to zone 74 wherein they are preheated and thence via conduits 110 and 104 to catalytic converter zone 76 wherein they are reacted before passing to the atmosphere via conduit 105.

At the same time, ambient air passes via conduit 111 to zone 70, to provide heat to the high pressure hydride alloy exchanger 69, and thence to atmosphere via conduits 112 and 113.

After an additional 2 minutes or so, preheating of the engine exhaust gases is no longer needed since the gases have reached normal operating temperature and the system can now be employed as an air conditioning system using the engine exhaust gas for the exchange heat source.

In the air conditioning mode, solenoid valve 72 is open permitting hydrogen flow between fully charged high pressure metal hydride alloy exchanger 69 and low pressure metal hydride alloy exchanger 73 via conduit 71. At the same time, gate valves 85, 93, 87 and 95 are closed and gate valves 86, 94, 88 and 96 are opened. Car interior air passes via conduit 114 into zone 70 wherein it is cooled and provides heat to the high pressure metal hydride alloy exchanger 69 which has undergone a temperature drop by reason of dehydrogenation. Cooled interior air passes to the car interior via conduit 115. Ambient air passes via conduit 116 to zone 74 and contacts the low pressure metal hydride alloy exchanger 73 and removes by indirect heat exchange heat generated by occlusion of hydrogen in exchanger 73. The ambient air passes to atmosphere via conduit 117 and 113.

While zone 70 is providing interior air cooling, the other exchanger pair is being restored to the appropriate state for subsequent air conditioning service. Specifically, gate valves 81, 89, 83 and 91 are closed; gate valves 82, 90, 84 and 92 are open. Engine exhaust gases pass via conduits 101 and 102 to zone 68 wherein the exhaust gases provide heat to dehydrogenate the low pressure metal hydride alloy exchanger 67. The exhaust gases pass from zone 68 via conduits 103 and 104 to catalytic conversion zone 76 and thence to atmosphere via conduit 105. At the same time, ambient air passes via conduits 106 and 118 to zone 64 where the air removes by indirect heat exchange the heat of hydrogen occlusion from high pressure hydride alloy exchanger 63. The ambient air passes from zone 64 to atmosphere via conduits 107 and 108.

When the cooling capacity of exchanger 69 is exhausted and regeneration of exchanger 63 is complete, the systems are reversed. Specifically, gate valves 82, 90, 84, 92, 86, 94, 88 and 96 are closed, and gate valves 81, 89, 83, 91, 85, 93, 87 and 95 are opened. Hydrogen is transferred from high pressure exchanger 63 to low pressure exchanger 67 via conduit 65 with interior air being cooled by passing via conduits 121 and 118 to zone 64 and exiting via conduit 119 to cool the vehicle interior. Heat of occlusion is removed from exchanger 67 by exchange with ambient air introduced via conduit 120 to zone 68 and exiting to atmosphere via conduits 121 and 108. At the same time, hot engine exhaust gases pass via conduit 109 to zone 74 and provide heat to dehydrogenate the low pressure hydride metal alloy in exchanger 74 before passing via conduits 110 and 104 to catalytic conversion zone 76 and thence to atmosphere via conduit 105. Ambient air passes via conduit 111 to zone 70 wherein it removes heat of occlusion from exchanger 69 before exiting via conduits 112 and 113 to atmosphere.

Thus it can be seen that practice of the invention as described in FIG. 4 provides immediate preheat to engine exhaust gases when the engine is cold started, and after the preheat is no longer needed, the system functions to continuously provide interior vehicle air conditioning.

The metal hydride alloy systems which are employed in the invention consist of a low pressure metal hydride alloy characterized by a very low hydrogen pressure at ambient temperature and a reasonably low hydrogen pressure at temperatures in the range 300°–500° C., preferably not above 100 atmospheres absolute at 500° C. and most preferably not above 10 atmospheres absolute at 500° C., and a high pressure metal hydride alloy characterized by a reasonably high hydrogen pressure at ambient temperature, e.g. at least 10 psia, and preferably at least 1 atmosphere absolute at 20° C.

Examples of low pressure metal hydride alloys include Zr, Ti, Mg, $Mg_2Cu$, $Mg_2Ni$, Pd, ZrNiMm, and the like, Mm being mischmetal.

Examples of high pressure metal hydride alloys include Va, $LaNi_{5-x}Al_x$, $MnNi_{5-x}Al_x$, $CaNi_5$, TiFe, $Ti(Fe_{0.8}Ni_{0.2})$, $Ti(Fe_{0.9}Mn_{0.1})$, $LaNi_{4.9}Al_{0.1}$, and the like.

An important safety design consideration in the selection of appropriate metal alloy pairs is to ensure that the system hydrogen pressure during operation does not exceed about 1000 psig and preferably does not exceed 100 psig. Also, the alloy kinetics must be adequately fast at the pressures employed, and the low pressure alloy should have high heat of formation so that it will have the heat storage potential needed to heat the exhaust gases or the converter to effective catalytic combustion conditions.

Figure 5:
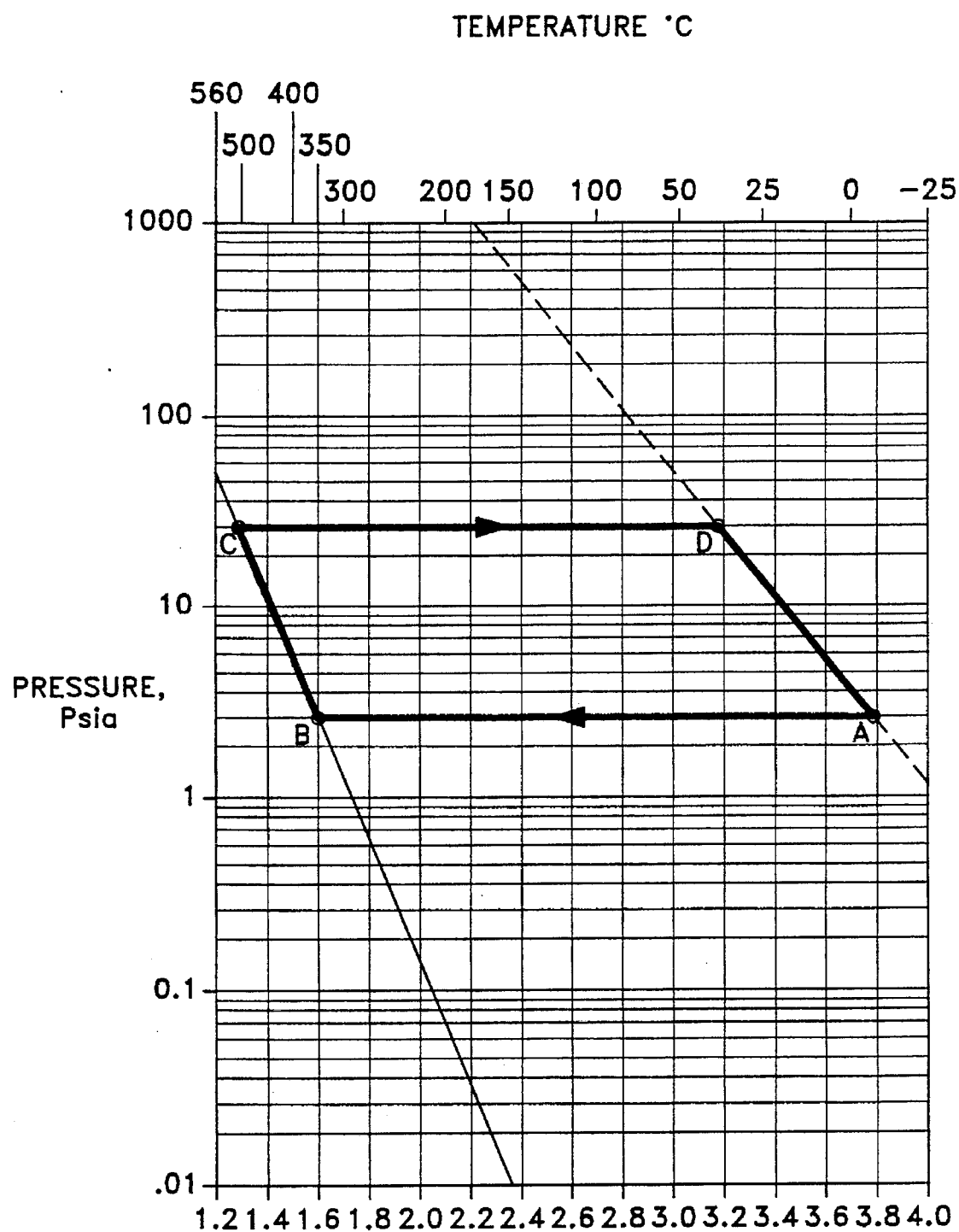
FIG. 5 shows a Van't Hoff plot of an appropriate pair of metal hydride alloys.

Accompanying FIG. 5 shows a Van't Hoff plot for an alloy pair comprised of ZrNiMm as the low pressure alloy and $LaNi_{4.9}Al_{0.1}$ as the high pressure alloy. The zone of operation in accordance with the invention is defined by A, B, C and D.

The metal hydride alloy heat exchangers used in the invention can be prepared in accordance with known procedures and configurations. An especially preferred system comprises a coiled tube circumscribing a flexible spring or a permeable organic plastic member, the space between the inner tube surface and the outer spring or plastic member surface being packed with the metal hydride alloy as described, for example in Golben, et al. U.S. Pat. No. 4,396,114, the disclosure of which is incorporated herein by reference. Conventional coiled tubes containing metal hydride alloy interconnected by hydrogen conduit and solenoid valve means can be used. Inconel is a suitable material for the coils although other metals capable of withstanding the high temperature conditions of service can be used. Where single coil exchangers are used, coil lengths of up to about 20 feet or more are generally useful; tubing having up to ½-inch O.D. or more can be used.

Figure 6:
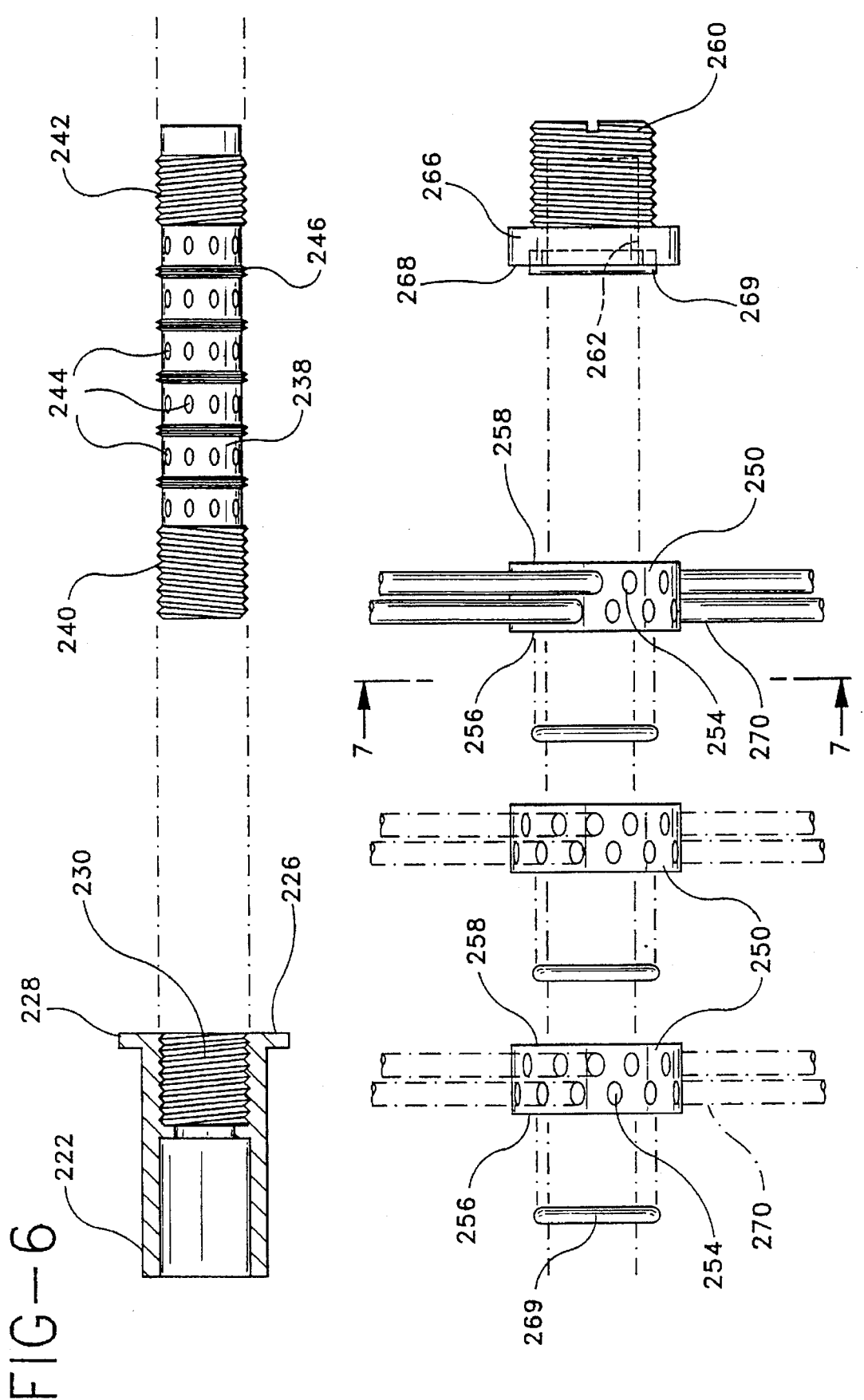
FIG. 6 illustrates in an exploded view a modular heat exchanger assembly useful in practice of the invention.
Figure 6A:
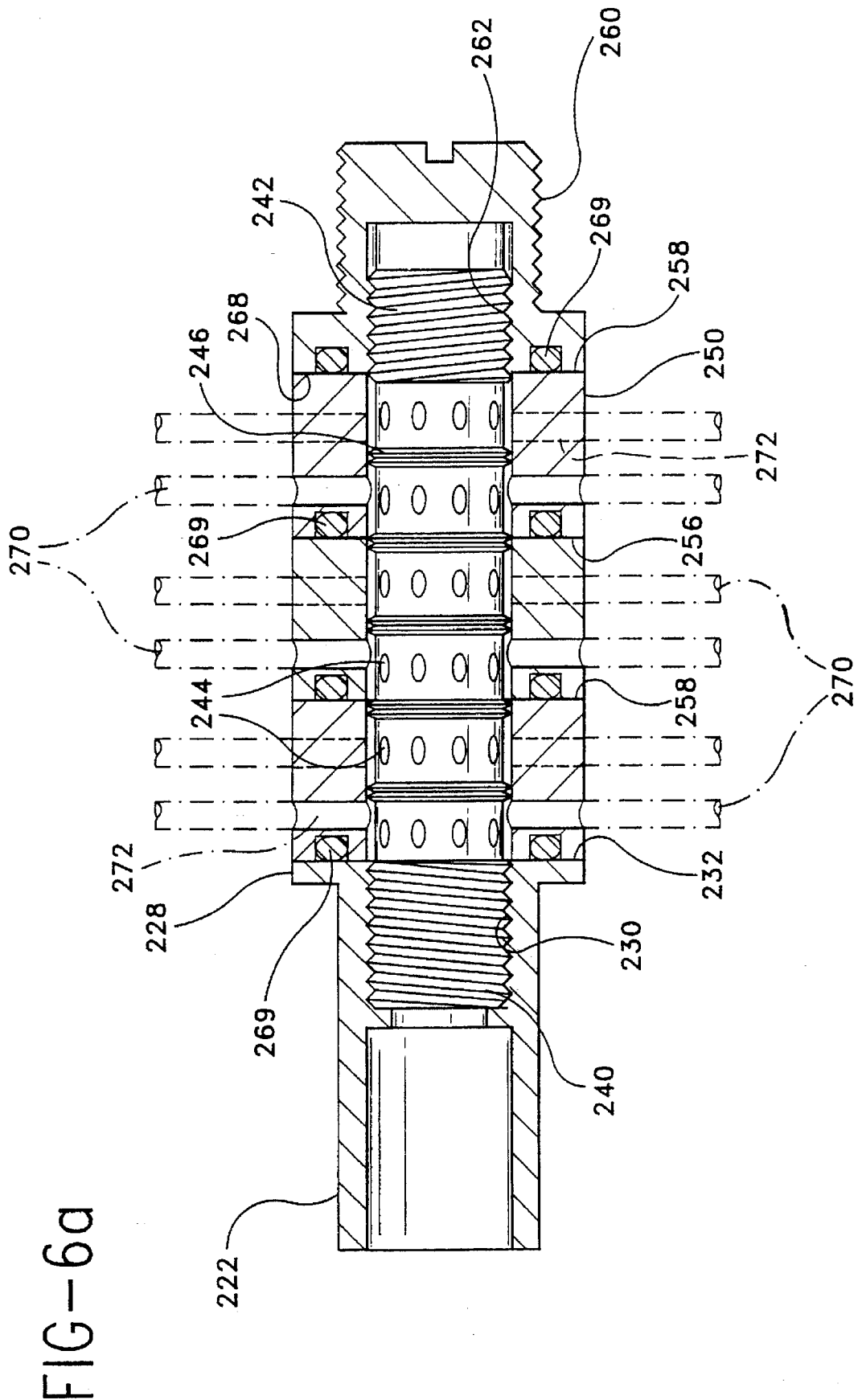
FIG. 6a illustrates the assembled modular heat exchanger of FIG. 6.

A novel and especially useful modular heat exchanger configuration which can be employed is that which is illustrated in attached FIGS. 6, 6a and 7.

Referring now to FIG. 6, an exploded view of a modular assembly useful according to the present invention is illustrated which is useful in attaching tubes of smaller diameter than heretofore known. In practice of the invention, a sealed system is provided such as described in FIG. 1 comprised of two modular heat exchanger assemblies each of which is as described in FIGS. 6, 6a and 7, one assembly containing the high pressure metal hydride alloy and the other containing the low pressure metal hydride alloy, the two modular assemblies being interconnected by hydrogen conduit and solenoid valve means.

For each modular assembly, an inlet conduit 222 is provided and with expanded flat end 228. The inner surface adjacent end 228 includes threads 230, shown in phantom, for connection to other elements of the assembly. An annular, radially extending, flat end surface 232 of the end 228 extends through a plane which lies substantially perpendicular to the centerline of 222.

A cylindrical ring manifold 238 is provided comprising a tubular element with two threaded ends 240, 242 and a number of apertures 244 which extend through the tube wall and are disposed circumferentially around the ring manifold 238. Each of the apertures 244 provides gas communication to the inside of the manifold 238. The threaded end 240 is adapted for connection to the threads 230 on the inner surface of the end 228 of conduit 222 and provides a framework for further connection with additional elements of the assembly, as is discussed below.

The ring manifold 238 advantageously includes upstanding ribs 246 which separate groups of apertures 244. The other threaded end 242 provides a connection for other elements of the assembly. Plural modular ring elements 250 are each adapted for sliding onto and over the ring manifold 238. Each ring element 250 comprises an annular ring having a central opening which has an inner diameter slightly larger than the outer diameter of the ring manifold 238. The ring element 250 has a plurality of apertures 254 which extend radially through the circumferential wall of the element 250 from the outer to the inner diameter surfaces.

Each ring element 250 can be fitted over the ring manifold 238 until it reaches a position overlying the apertures 244 of the ring manifold. Optimally, each aperture 254 of the ring element 250 is disposed over a portion of ring manifold 238 which includes an aperture 244. This arrangement should essentially provide more or less direct communication from the inner diameter of the manifold 238 through the apertures 244, 254 to the outside diameter of the ring element 250.

Each ring element 250 further provides two radially extending faces 256, 258 which, when assembled, are each disposed substantially perpendicularly to the centerline of the device. Preferably, each of the ring elements 250 are identical and interchangeable. Placing the plural ring elements 250 end-to-end, that is, each face 256 of one ring is placed adjacent face 258 of the next adjacent ring, provides a cylindrical tube having stacked annular ring elements 250. When assembled, the cylindrical tube formed by the ring elements 250 overlies the ring manifold 238.

The axial widths of the ring elements 250 between the faces 256, 258 are of a predetermined dimension. When the ring manifold 238 is screwably attached to valve threads 230 and the ring elements 250 are assembled over the ring manifold 238, there is a substantial portion of the threads 242 which protrude through the central opening of the last ring element 250 in the stack of plural ring elements. An end piece 260, having a chamber 262 with a threaded, circumferential, internal surface, is securably attached to the ring manifold 238. Threads 242 of the ring manifold 238 conform to the internal threads of the surface, thus enabling the end piece to be screwably attached onto the ring manifold 238.

End piece 260 also has a radially extending, circumferential flanged member 266 having a face 268 at the axial terminus which is coextensive with the face 258 of the last of the plural, stacked ring members 250. Accordingly, after assembly of the ring elements 250 over the ring manifold 238, the face 256 of the first ring element 250 is adjacent and opposite the flat end surface 232 and also, each of the walls 256, 258 of the other ring elements 250 are adjacent and opposite each other. Rotation and engagement of the end piece 260 onto the threads 242 of the ring manifold 238 brings the end face 268 of the end piece 260 opposite and adjacent the face 258 of the last ring element 250 in the stack.

As the end piece 260 is screwed onto the ring manifold 238, the face 268 exerts an axial pressure on the face 258 of the ring element 250 and, in turn, on each face 256, 258 of the stack of ring elements. In order to provide an airtight enclosure for the space inside the cylindrical tube comprised of the ring elements 250, a sealing element 269, such as a washer or O-ring, is disposed between each pair of faces 256, 258, 232, 256 and 258, 268. The sealing element 269 may be inserted into a circumferential groove 267 in each face 256 and in face 268, best shown in FIG. 7. The sealing element 269 comprises a soft crushable metal, such as 321 stainless steel (silver-plated) which will hermetically seal the faces against each other to eliminate passage of all gases, including hydrogen, through the seal.

FIG. 7 shows a front view of one of the ring elements 250, together with certain of the elements which are connected thereto. Referring now to FIGS. 6, 6a and 7, tubes 270 are shown connected into the ring elements 250. Each of the apertures 254 are adapted to receive a tube end 272 therethrough. FIG. 7 shows two tubes 270, the ends 272 of which tubes 270 have been inserted into adjacent apertures 254 which are disposed on the same modular ring element 250. FIG. 7 shows the ring element 250 having a radial face 256 and central opening 252, and being connected to only two of the plurality of tubes 270 for purposes of illustration.

FIG. 6a shows an assembled modular exchanger assembly with the same numbering as FIG. 6.

An end 272 of each tube 270 is shown inserted into an aperture 254 in fluid-tight relationship and extending in a spiral around the ring element 250. When the outwardly directed spiral of tube 270 reaches a point spaced farthest from the ring element 250, the spiral then becomes inwardly directed and returns toward the ring element 250 at another aperture 254 on the same ring element 250. For greater ease in manufacture and assembly, the tube 270 is not contained in a single plane but the path of the tube is shifted in a lateral direction, i.e. along the axial direction as defined by the centerline of FIG. 6, and the other end 272 of each tube is inserted through an aperture 254 that is in a different circumferential and axial position on the ring element 250.

For convenience during assembly, the apertures 254 can comprise twelve equally spaced apertures disposed along a circumferential path on the ring element 250 in two rows. One row is connected to all of the outwardly directed spirals of tubes 270, and the other row of apertures 254 is connected to all of the inwardly directed tube ends 272. The second row of apertures 254 are not visible in FIG. 7 because they are behind the outwardly directed tube ends 272.

The shift in lateral position of the tube 270 is necessary because as each tube 270 reaches its outer periphery as measured from the ring element 250, the tubes 270 would intersect if they were in the same plane. Because each tube 270 has an identical path, but a different circumferential starting and end point (at successive apertures 254 in different planes) each of the twelve tubes 270 are offset by 30° in the circumferential direction. Thus intersection of the tubes at the outer periphery is avoided, and the final configuration appears to comprise a single assembly of plurality of intertwined tubes 270 with layers of tubes 270 being disposed one on top of another.

Tubes 270 illustratively comprise metal tubes, e.g. inconel, having an outer diameter of about 0.32 cm (⅛-inch)

and having a radial wall thickness of approximately 0.025 cm (0.010-inch). These parameters have been found capable of containing gas under pressures of up to 3000 p.s.i. without failure of the tube 270. The length of tubes 270 can be any desirable length, depending on the desired final dimensions of the assembled modular heat exchange unit. A length of about two feet is appropriate for a smaller size heat exchange unit, and results in the outer periphery of all of the tubes 270 having an essentially circular configuration with a diameter of about 16.51 cm (6.5 inches). A length of four feet for tubes 270 results in an outer diameter of the periphery of about 25.4 cm (10 inches). Lengths up to about 20 feet are illustrative.

The tubes 270 are not in the same plane, but are shifted a slight distances, as is explained above. The distance which tubes 270 are shifted, however, is small compared to the outer diameter of the periphery of the assembly. In fact, all of the tubes 270 are within a space which is bounded by the planes defined by the radial walls 256, 258 of modular ring element 250.

This configuration provides for assembly of the modular ring elements 250 in stacks after the tubes 270 have been connected to the apertures 254 of the ring elements 250. Other configurations are possible in which the tubes 270 may be out of the plane boundaries, as long as each modular ring element 250 is consistently identical and the tubes 270 do not interfere with the tubes 270 of the adjacent modular ring elements 250.

It is also possible that the tube 270 can have a shape other than a spiral, or indeed, that only one end 272 of each tube 270 is connected to the ring element 250. The configuration shown in FIGS. 6, 6a and 7, however, is preferable from the consideration of compactness, and also to provide better circulation and transfer of gas through the tubes 270 and through the system during operation.

In accordance with generally known practices, positioned within tubes 270 are the metal hydride alloys. Preferably, as described in U.S. Pat. No. 4,396,114, flexible tubular means porous to the passage of hydrogen gas therethrough, e.g. a stainless steel garter spring, coaxial with tube 270, is provided. The annular space between the outer surface of the spring and the inner surface of tube 270 is packed with the appropriate metal hydride alloy. The center portion within the flexible spring provides a passage for hydrogen during use.

A special advantage of the modular heat exchanger assemblies described above is that the exchangers operate extremely rapidly with minimum cycle times. Upon the opening of the solenoid valve means connecting the low pressure metal hydride alloy exchanger and the high pressure metal hydride alloy exchanger there is an almost instantaneous transfer of hydrogen from the high pressure alloy to the low pressure alloy. This transfer is accompanied by an almost instantaneous cooling of the high pressure alloy and heating of the low pressure alloy, thus providing the temperature increase in the low pressure alloy exchanger necessary to bring the cool engine exhaust gases almost immediately to catalytic conversion temperatures. Similarly, the cycle is rapidly reversed when the exhaust gases have attained their normal operating temperatures resulting in transfer of hydrogen from the low pressure metal hydride exchanger back to charge the high pressure metal hydride exchanger.

In practice of the invention such as described in FIG. 1, one modular assembly containing the low pressure metal hydride alloy is mounted by conventional means in heat exchange relationship with engine exhaust gases such that the exhaust gases pass in direct contact with tubes 270 of the modular assembly before passing to the catalytic converter.

The modular assembly containing the low pressure metal hydride alloy is connected by a hydrogen conduit and solenoid valve means to a similar modular assembly which is conventionally mounted in a zone through which ambient air is passed in direct heat exchange contact with tubes 270 thereof.

The two modular assemblies connected by the hydrogen conduit and valve means form a closed system which effectively functions as described above in connection with FIG. 1.

Similar modular assembly pairs effectively function as described in connection with FIGS. 2 and 3.

In the embodiment shown in FIG. 4, two modular assembly pairs, each pair forming a closed system, are employed.

EXAMPLE

In a particular practice of the invention as illustrated in FIG. 1, a sealed system is provided comprised of a coiled tubular inconel low pressure metal hydride alloy exchanger which is mounted such that the exchanger coils are in direct heat exchange with exhaust gases from the engine prior to passage of these gases through the conventional catalytic converter. A coiled tubular inconel high pressure metal hydride alloy exchanger in closed relationship with said low pressure exchanger is mounted in close proximity to the low pressure exchanger but external of the engine exhaust line. The high pressure exchanger is positioned such that ambient air passes in direct heat exchange contact with the tubes thereof.

Each coiled inconel exchanger has ⅜-inch O.D. and is 14 feet long.

Mounted in each tubular exchanger coil is a stainless steel garter spring 0.175 inches O.D. and 0.1-inch I.D.

Surrounding the flexible garter spring central portion of the tube comprising the low pressure metal hydride alloy exchanger is the ZrNiMm low pressure alloy and similarly, surrounding the garter spring mounted in the tube comprising the high pressure metal alloy exchanger is the $LaNi_{4.9}A_{10.1}$ high pressure metal hydride alloy.

The system is initially charged with hydrogen such that at 20° C. the hydrogen pressure of the high pressure metal hydride alloy is 50 psia and the hydrogen pressure of the low pressure metal hydride alloy is 0.001 psia. When the ignition key is turned on, the solenoid valve in the connecting conduit between the alloy exchangers opens and hydrogen immediately flows from the high pressure exchanger to the low pressure exchanger. Within 5 seconds the temperature of the low pressure metal hydride alloy exchanger increases from 20° C. to about 350° C. due to occlusion of hydrogen thereon. At the same time the temperature of the high pressure alloy exchanger drops from 20° C. to about −10° C. due to the dehydrogenation of the high pressure alloy. During the initial period of operation, exhaust gases passing in heat exchange contact with the tubular low pressure exchanger are heated to effective catalytic conversion temperatures of about 250° C. or more. At the same time, ambient air is passed in heat exchange contact with the tubular high pressure alloy exchanger, providing heat for the transfer of hydrogen from the high pressure exchanger to the low pressure exchanger.

After about 2 to 4 minutes of operation, the solenoid valve is closed. At this point the engine exhaust gases have attained a normal operating temperature of about 400° C. and serve to heat the low pressure metal alloy tubular exchanger resulting in dehydrogenation of the low pressure metal hydride alloy. The hydrogen passes via the one-way valve system through conduit 16 and one-way valve 17 to the high pressure metal hydride alloy exchanger wherein the hydrogen is occluded. This transfer continues while the engine is in operation, and when ignition ceases, the system cools to ambient temperature and is in a state of readiness for the next period of operation.

We claim:

1. A modular heat exchanger comprising: tubular manifold means for the distribution of gas through a plurality of aperatures in the manifold, one or more ring elements adapted to fit over said manifold, said ring elements having a plurality of appertures extending from the inner to the outer surface thereof, tubular means containing a metal hydride alloy having a first and second end each of which is inserted through appertures in the same ring element in a gas-tight sealed relationship with said ring element, means for mounting said ring elements on said manifold, and means for sealing said ring elements against passage of gas except between said tubular means and the manifold interior.

2. A fast-acting, modular heat exchanger comprising:

a plurality of annular modules adapted for sealing connection to each other, said modules, when assembled, providing a manifold for gas communication between the inner portion of said annular modules and an external conduit, each said module including a plurality of apertures for receiving a plurality of small-diameter metal tubes, each said metal tube including a metal hydride disposed within and along the length of each said tube, said metal hydride for containing a heat transfer gas, each said tube having two ends, at least one of each said tube ends providing a passage for said heat transfer gas to said interior of the module to which the tube end is connected, each said module further including means for hermetically sealing at least one of said tube ends to a respective one of said module aperture;

means for hermetically sealing each of said modules to each other to against the passage of gas except between the tubes and the interior of said modules, and means for connecting said heat exchanger manifold to said external conduit.

3. The heat exchanger according to claim 2 wherein said heat transfer gas comprises hydrogen.

4. The heat exchanger according to claim 3 wherein said small diameter tubes provide a capability to the heat exchanger to have a one-half cycle time of less than three minutes.

5. The heat exchanger according to claim 3 wherein said small diameter tubes provide a capability to the heat exchanger to have a one-half cycle time of less than one minute.

6. The fast-acting, modular heat exchanger according to claim 2 further comprising a ring manifold for supporting said annular modules, said annular modules having an inner diameter central opening of a size enabling the ring manifold to be inserted there through, said ring manifold including means to attach an end piece of said modules at each end of said manifold.

7. An air cooling system comprising:

a plurality of heat exchangers, each said heat exchanger including a plurality of annular modules adapted for sealing connection to each other, said modules, when assembled, providing a manifold for gas communication between the inner portion of said annular modules and an external conduit, each said module including a plurality of apertures for receiving a plurality of small-diameter metal tubes, each said metal tube including a metal hydride disposed within each said metal tube along its length, said metal hydride containing a heat transfer gas, and each said metal tube having at least two ends, at least one of said tube ends providing a passage for said heat transfer gas to the respective module with which said tube is associated, each said module further including means for hermetically sealing said at least one tube end to one of said module apertures;

means for hermetically sealing each of said modules one to another to provide said manifold;

means for connecting at least two of said heat exchangers to each other by means of respective external conduits so that said at least two heat exchangers are in gas transfer communication with each other;

a source of heat for providing heat to each of said heat exchanges;

means for applying said heat from said source to a first one of said plurality of heat exchangers, whereby applying heat to said first heat exchanger causes desorbtion of said heat transfer gas in said first heat exchanger metal hydride and transfer of said heat transfer gas from said first one heat exchanger through said means for connecting said at least two heat exchangers to a second at least one of said heat exchangers, said heat transfer gas being absorbed by said metal hydride contained by said second heat exchanger; and means for passing a cooling medium available externally of said heat exchangers such that said second heat exchanger is cooled by cool said cooling medium being directed across said heat exchanger.

8. The heat exchanger according to claim 4 wherein said heat transfer gas comprises hydrogen.

9. The system according to claim 4 wherein said metal tubes are wound in a loose spiral about the respective annular module to which they are sealed and the second end of each said metal tube is also connected to another of said apertures of said annular module.

10. The system according to claim 4 wherein said heat exchanger comprises at least three annular modules.

11. The system according to claim 10 wherein said means for connecting at least two of said heat exchangers to each other comprises an external tubular conduit which is sealingly connected to one end of said modular manifold of each said at least two heat exchangers.

12. The system according to claim 11 wherein said external tubular conduits further comprise valves for permitting and for preventing transfer of the heat transfer gas.

* * * * *